United States Patent [19]
McKiel, Jr.

[11] Patent Number: 5,223,828
[45] Date of Patent: Jun. 29, 1993

[54] METHOD AND SYSTEM FOR ENABLING A BLIND COMPUTER USER TO HANDLE MESSAGE BOXES IN A GRAPHICAL USER INTERFACE

[75] Inventor: Frank A. McKiel, Jr., Dallas, Tex.

[73] Assignee: International Business Machines Corporation, Armonk, N.Y.

[21] Appl. No.: 746,838

[22] Filed: Aug. 19, 1991

[51] Int. Cl.$^5$ .............................................. H04Q 1/00
[52] U.S. Cl. .............................. 340/825.19; 340/709; 341/21; 434/116
[58] Field of Search .................. 340/825.19, 709, 710, 340/712, 715, 721; 341/21; 395/154, 157, 159, 2; 381/52; 434/112, 116; 379/52

[56] References Cited

U.S. PATENT DOCUMENTS

| | | | |
|---|---|---|---|
| 3,800,082 | 3/1974 | Fish | 434/116 |
| 4,322,744 | 3/1982 | Stanton | 434/116 |
| 4,587,520 | 5/1986 | Astle | 340/712 |
| 4,644,339 | 2/1987 | Ruder | 340/709 |
| 4,831,654 | 5/1989 | Dick | 381/52 |
| 4,868,549 | 9/1989 | Affinito et al. | 340/710 |
| 4,875,185 | 10/1989 | Bornschein | 340/825.19 |
| 5,109,482 | 4/1992 | Bohrman | 395/154 |

OTHER PUBLICATIONS

Lazzaro, "Windows of Vulnerability", Jun., 1991, Byte Magazine p. 416.
Golding, et al, "Audio Response Terminal", IBM Tech. Disc. Bulletin, vol. 26, No. 10B, Mar., 1984, pp. 5633–5636.
Barnett, et al, "Speech Output Display Terminal", IBM Tech. Disc. Bulletin, vol. 26, No. 10A, Mar. 1984, pp. 4950–4951.
Comerford, "Seeing Eye Mouse", IBM Tech. Disc. Bulletin vol. 28, No. 3, Aug. 1985, pp. 1343–1344.
Affinits, et al, "Braille Computer Mouse with Tactile Position Feedback", IBM Tech. Disc. Bulletin, vol. 31, No. 12, May 1989, p. 386.
Drumm, et al, "Audible Cursor Positioning and Pixel Status Identification Mechanism", IBM Tech. Disc. Bull. vol. 27, No. 4B, Sep. 1984, p. 2528.

Primary Examiner—Donald J. Yusko
Assistant Examiner—Edwin C. Holloway, III
Attorney, Agent, or Firm—Jonathan E. Jobe, Jr.

[57] ABSTRACT

Disclosed is a system and method that enables blind or visually impaired computer users to handle message boxes in a graphical user interface. When a message box first appears, the textual content of the box is announced audibly and an audible homing signal is produced. In the preferred embodiment, the homing signal is a tone whose pitch increases as the distance between the pointer and the message box decreases.

7 Claims, 4 Drawing Sheets

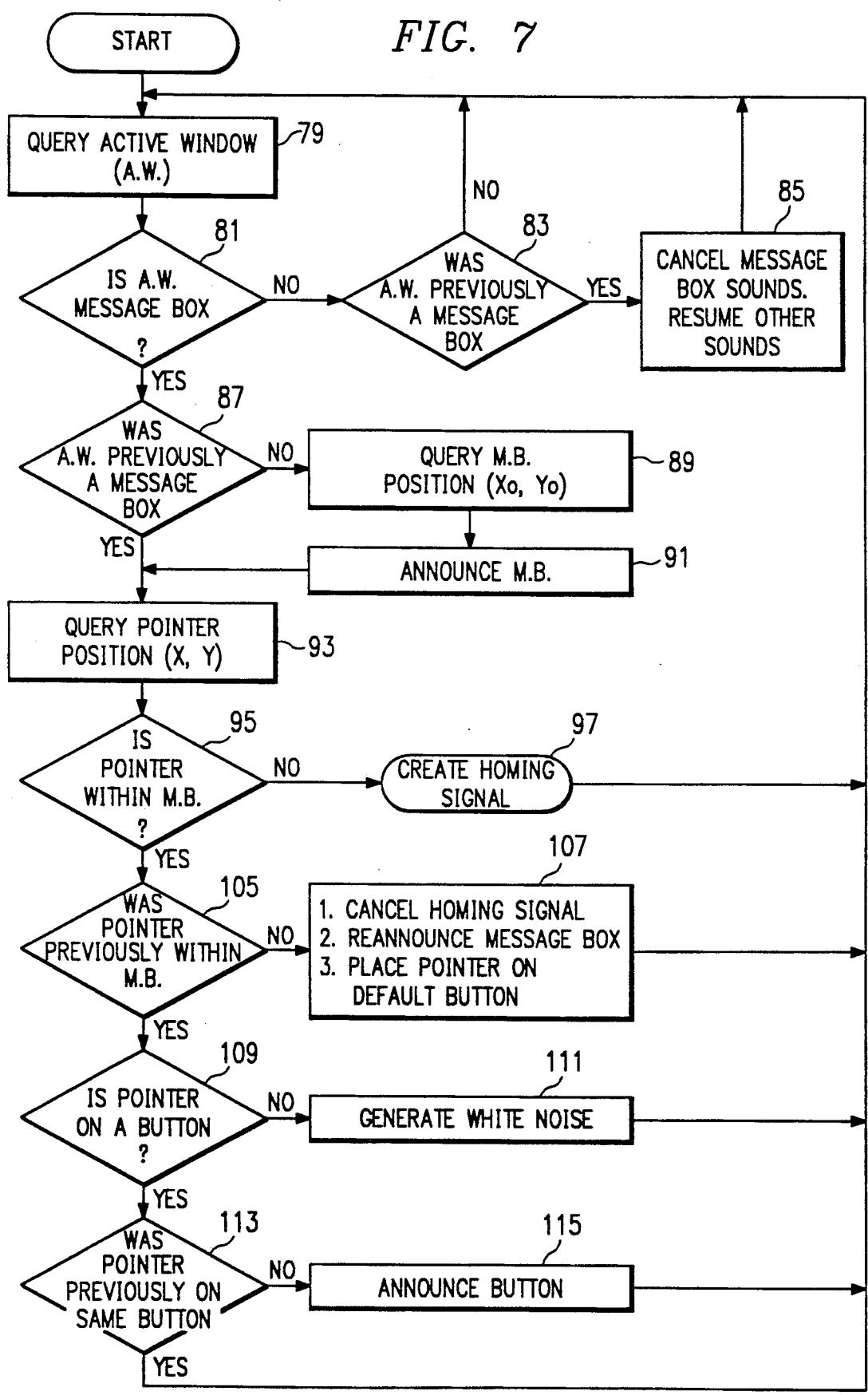

METHOD AND SYSTEM FOR ENABLING A BLIND COMPUTER USER TO HANDLE MESSAGE BOXES IN A GRAPHICAL USER INTERFACE

BACKGROUND OF THE INVENTION

1. Field of the Invention

The present invention relates generally to a system and method for enabling a blind or visually impaired user to use a graphical user interface, and more particularly to a system and method for enabling a blind or visually impaired user to handle message boxes in a graphical user interface.

2. Description of the Prior Art

In recent years, there has been a move among computer application software developers toward graphical user interfaces. In graphical user interfaces, objects are presented for users to manipulate in ways that are similar to the way that they are manipulated in the real work place. Objects, such as file cabinets, folders, documents, and printers, are displayed on the screen as icons. Users manipulate these objects with a mouse to perform desired operations. For example, to file a document in a folder that is located in a file cabinet in the real work place, the user opens the file cabinet, locates and opens the correct folder, and puts the document inside. In the electronic work place of the graphical user interface, the user performs a similar process. The user opens the file cabinet icon, locates the correct folder icon, and drops the document icon in the folder. Because this is an electronic environment, users do not have to open the folder to put the document in it. However, users have been able to use their knowledge of a real work place to perform this operation.

Normally sighted persons find graphical user interfaces intuitive and easy to work with. However, except for an occasional "beep" or "bong", graphical user interfaces are virtually silent and the vast majority of the information they provide to the user is visual. Thus, graphical user interfaces are essentially not usable by blind or severely visually impaired people.

Blind and visually impaired computer users now benefit from many forms of adaptive technology, including speech synthesis, large-print processing, braille desktop publishing, and voice recognition. However, presently, almost none of the foregoing tools is adapted for use with graphical user interfaces. It has been suggested that programmers could write software with built-in voice labels for icons. Lazzaro, *Windows of Vulnerability*, Byte Magazine, June, 1991 page 416. Various synthetic or recorded speech solutions for making computer display screen contents available to blind persons have been suggested, for example in Golding, et. al., IBM Technical Disclosure Bulletin, Vol. 26, No. 10B, pages 5633-5636 (March, 1984), and Barnett, et. al., IBM Technical Disclosure Bulletin, Vol. 26, No. 10A, pages 4950-4951 (March, 1984). Additionally, there have been suggested systems that include a mouse with a braille transducer so that a blind user may read text and obtain certain tactile position feedback from the mouse. Comerford, IBM Technical Disclosure Bulletin Vol. 28, No. 3, page 1343 (August, 1985), Affinito, et. al., IBM Technical Disclosure Bulletin Vol. 31, No. 12, page 386 (May, 1989). However, while announcing various text items, either audibly or by means of a braille transducer in the mouse, may provide some information to blind user, it does not enable the user to navigate about and locate objects on the computer display screen.

There has been suggested an audible cursor positioning and pixel (picture element) status identification mechanism to help a user of an interactive computer graphics system locate data by using aural feedback to enhance visual feedback. As the cursor is stepped across the screen, an audible click is generated that varies in tone corresponding in tone to the current status of each pixel encountered. With this combination in audible and visual cursor feedback, it becomes a simple task to identify the desired line by noting the change in tone as the cursor moves. For color display applications, each color is represented by a distinct tone so any single pixel may be distinguished from the surrounding pixels of a different color. It has been suggested that this system is especially helpful for visually impaired or learning disabled users. Drumm, et. al., IBM Technical Disclosure Bulletin, Vol. 27, No. 48, page 2528 (September, 1984). However, the foregoing disclosure does not suggest a means of enabling a blind user to navigate about or locate objects on the computer display screen.

One feature of graphical user interfaces is the message box. A message box provides information, warning, or action messages to the user. Every message box consists of an icon, explanatory text, and one or more push buttons. The icon allows the user to identify visually the type of message. The text explains the situation and may provide assistance. The text may be a question or a statement. The push buttons allow the user to interact with the message box.

A message box may appear anywhere on the screen. When a message box appears, the system becomes and remains unavailable to the user until the user has acknowledged or responded to the message by selecting one of the push buttons. Thus, the user must read the message, move the pointer to an appropriate response push button, and operate the push button before the user can continue. When the user "clicks" on the appropriate push button, the message box is cancelled and the user may proceed.

Message boxes thus present a number of problems to the blind user. Presently, the only non-visual notification that a message box has appeared is a short beep. Since message boxes can appear anywhere on the screen, the blind user is at a complete loss to know what the message box is about, much less find it and act on it.

SUMMARY OF THE INVENTION

The present invention provides a system and method to accommodate the blind or visually impaired user in handling message boxes in a graphical user interface. When a message box first appears, the text contents are announced using a text-to-speech system or similar means. After the text is announced, the push buttons available to respond to or cancel the message box are also announced in order from left to right. Next, a homing signal is provided for finding the message box. In the preferred embodiment, the homing signal is a tone that increases in pitch as the pointer approaches the message box. When the pointer enters the message box, the message box text and the available push buttons are reannounced and the pointer automatically moves to the default push button. As long as the pointer is on a button, the system remains silent. If the user desires to select a push button other than the default, the user may move the pointer to the left toward the other buttons.

When the pointer is in the message box but not on a button, the system generates white noise. When a pointer enters a button, the response indicated by the button is announced. Should the user exit the message box, the homing signal returns and upon reentry the box reannounces. The system continues in the foregoing fashion until the user selects one of the push buttons, whereupon the message box disappears and the user may continue with the application.

BRIEF DESCRIPTION OF THE DRAWINGS

FIG. 7 is a flowchart showing a preferred software implementation of the present invention.

DESCRIPTION OF THE PREFERRED EMBODIMENT

Figure 1:
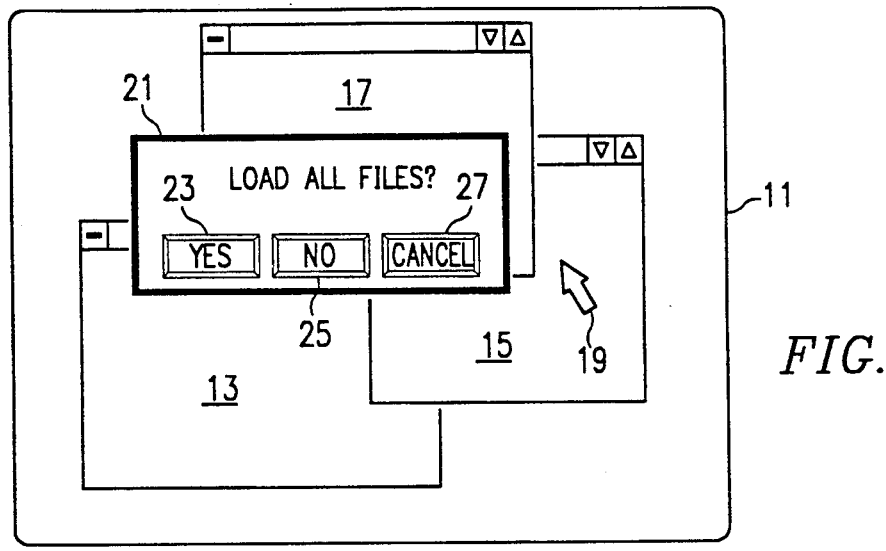
FIG. 1 is a pictorial view of a computer display screen with a message box displayed thereon.

Referring now to the drawings, and first to FIG. 1, a computer display screen is designated generally by the numeral 11. Display screen 11 has displayed thereon a plurality of windows 13, 15, and 17. Windows 13–17 are merely illustrative and those skilled in the art will recognize that each window represents an application. A pointer 19 is displayed on screen 11 and those skilled in the art will recognize that pointer 19 may be moved about screen 11 by means of a mouse (not shown).

FIG. 1 illustrates the situation immediately after the user has invoked an action to load files. A message box 21 is displayed on top of the other windows to inquire of the user whether the user wishes to load all files. Before the system can proceed, the user must acknowledge and respond to the message. Message box 21 contains a set of push buttons including "YES" button 23, "NO" button 25, and "CANCEL" button 27, which is the default button. The user must navigate pointer 19 to message box 21 and "click" on one of buttons 23–27. As can be imagined, with only visual cues, a blind or visually impaired user would find it almost impossible to make an appropriate response to message box 21. Accordingly, in the present invention, as soon as message box 21 appears, the message box is announced using text-to-speech or recorded speech. The announcement includes the message box text, the list of response options, and the default response. Thus, the system announces "LOAD ALL FILES? YES, NO, CANCEL. CANCEL."

Figure 2:
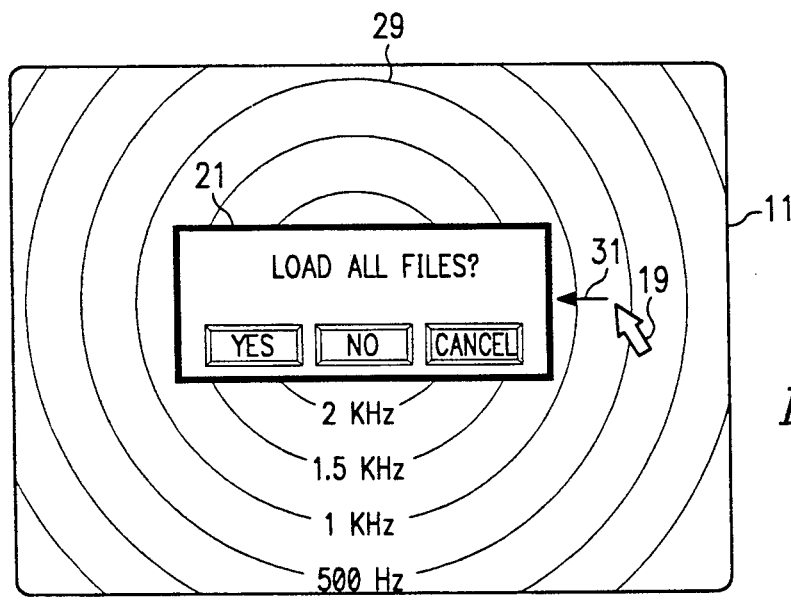
FIG. 2 is a pictorial view of the screen of FIG. 1 showing lines of constant frequency.

Since pointer 19 is outside message box 21, the user must find message box 21 before proceeding. Referring to FIG. 2, the present invention provides a homing signal that allows the user to locate the message box. In the preferred embodiment, the homing signal is a tone whose pitch or frequency is related to the distance from the pointer to the message box. In FIG. 2, circles of constant frequency including circle 29 are shown. The circles of constant frequency are illustrated in FIG. 2 for purposes of illustration only and do not, in the preferred embodiment, actually appear on display screen 11. As depicted by arrow 31, as pointer 19 approaches message box 21, the pitch of the homing signal increases. Conversely, if pointer 19 is moved away from message box 21, the pitch of the homing signal decreases. By optimizing the pitch of the homing signal along each axis, the user can quickly find message box 21.

Figure 3:
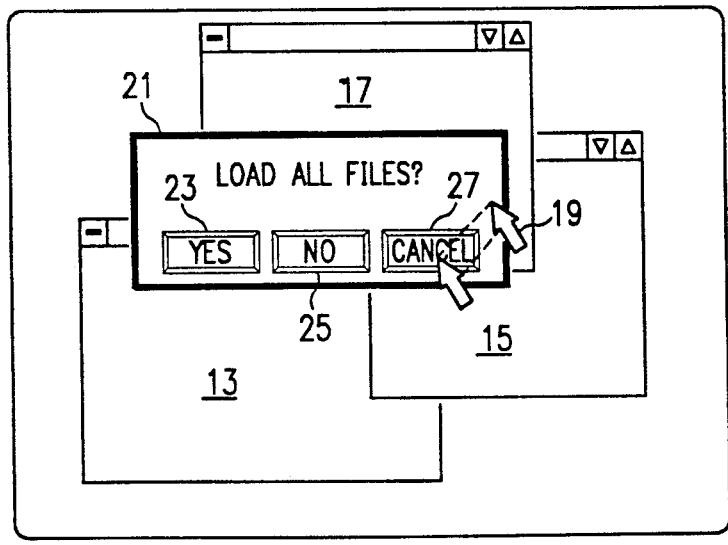
FIG. 3 is a view similar to FIG. 1 showing the pointer moved to the message box.

Referring to FIG. 3, when pointer 19 enters message box 21, the homing signal is turned off and pointer 19 jumps a short distance to the default "CANCEL" push button 27. Virtually simultaneously, the system reannounces the message box. The reannouncement consists of the spoken text "LOAD ALL FILES? YES, NO, CANCEL. CANCEL." thus, the user is reminded of the message and the user knows that pointer 19 is on the cancel button.

Figure 4:
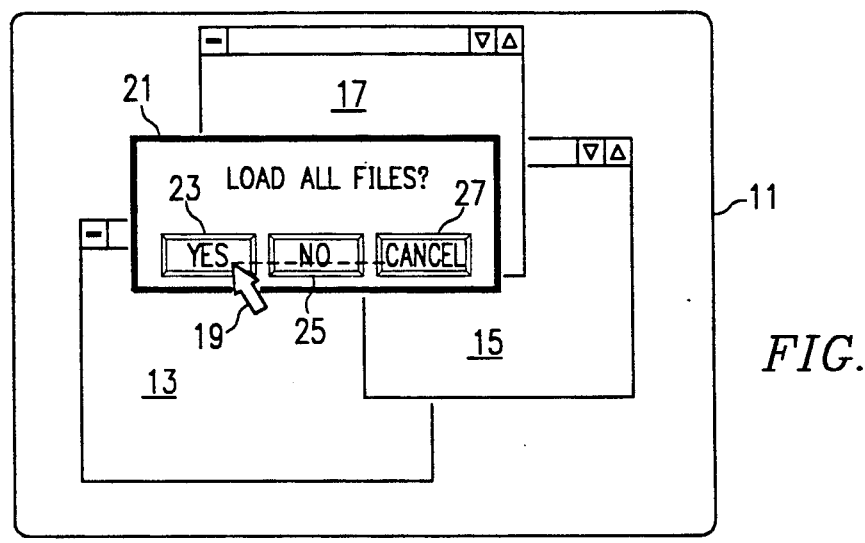
FIG. 4 is a view similar to FIG. 1 showing the movement of the pointer from push button to push button.

As long as the user remains on a button, the system remains silent. Referring to FIG. 4, which depicts the movement of pointer 19 across "NO" push button 25 to "YES" push button 23, whenever pointer 19 is inside message box 21 but not on a button, the system generates white noise. Each time cursor 19 enter a button, the white noise is turned off and the name of the button is announced. Thus, in the sequence depicted in FIG. 4, the system would produce the following audible information "(white noise) NO. (white noise) YES. (silence)." The user can move pointer 19 back and forth until he selects the appropriate button. If the user moves pointer 19 outside message box 21 before making a selection, the system will again produce the homing signal.

Figure 5:
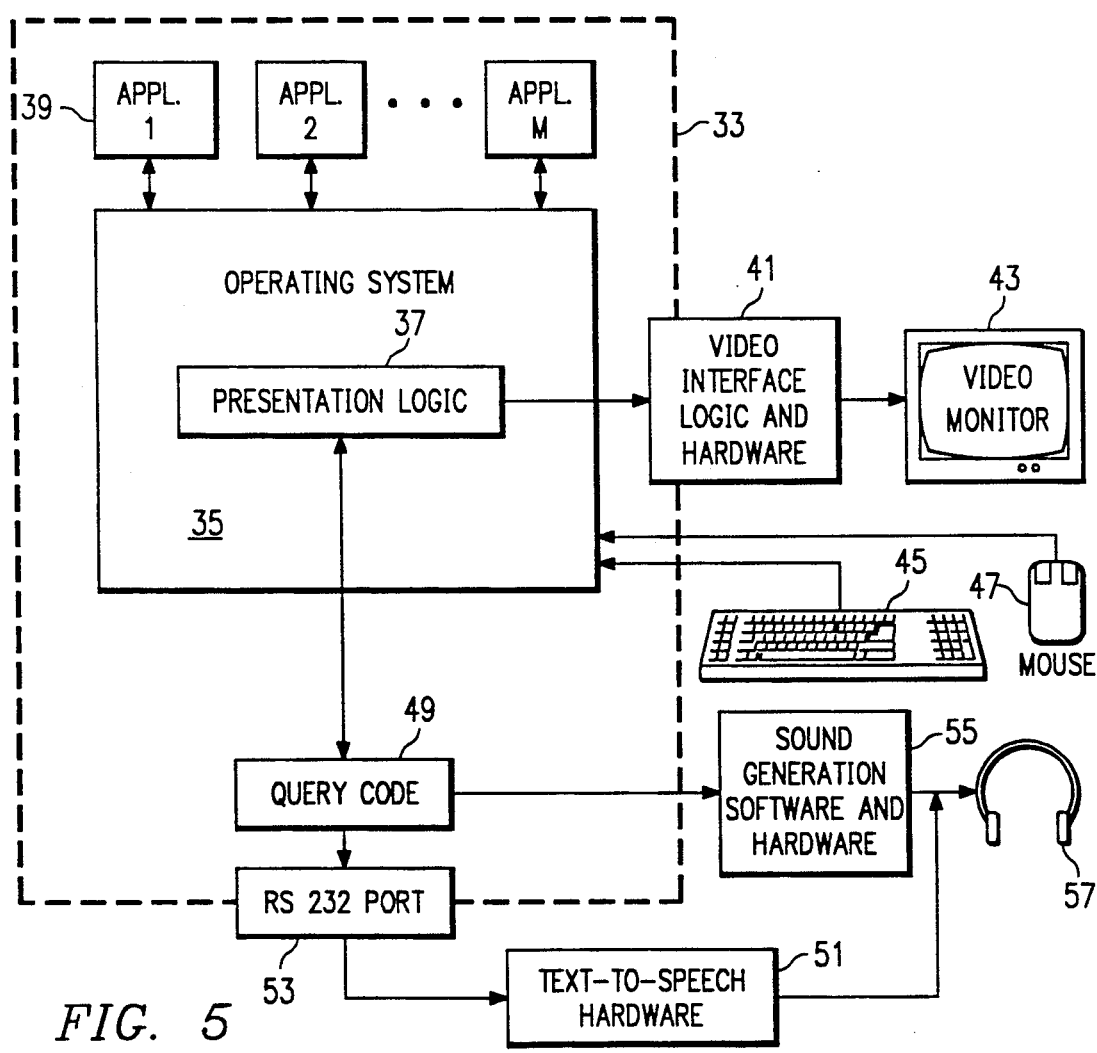
FIG. 5 is a block diagram of a preferred system of the present invention.

Referring now to FIG. 5, there is shown a block diagram of the system of the present invention. The system includes CPU hardware which is indicated generally by dashed block 33. Running on CPU hardware is operating system 35, which includes presentation logic 37. Presentation logic 37 manages the presentation of text and graphic information on the computer display screen. A plurality of application programs 39 are shown running on operating system 35. The system includes video interface logic and hardware 41, which supplies video information to a video monitor 43.

The system includes a keyboard 45 and mouse 47, which allow the user to input data and operate the system. The system also includes query code, which is designated generally by the numeral 49. As will be described in greater detail, query code 49 queries the system as to the current type of window, position of window, and current pointer position. Query code 49 also provides text information to text-to-speech hardware 51 via RS232 port 53 and sound information to sound generation software and hardware, shown generally at block 55. The speech and sound information is provided to the user by speakers or headphones 57. Text-to-speech hardware 51 is commercially available.

Figure 6:
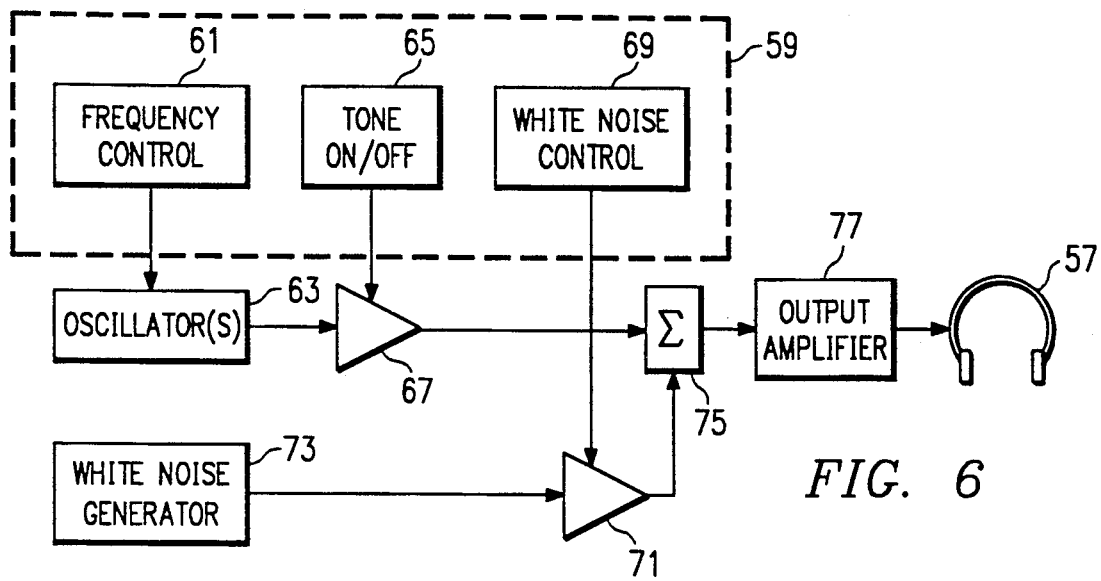
FIG. 6 is a block diagram of a preferred sound generator of the system of the present invention.

Referring now to FIG. 6, details of the sound generation software and hardware are shown. The software outputs are enclosed in dashed rectangle 59 and they include frequency control 61, which controls an oscillator or oscillators 63. Oscillator 63, under control of frequency control 61, produces the homing signal. The software outputs also include a tone on/off output 65, which controls an electronic switch 67. Electronic switch 67 in effect turns on and off the tone from oscillator 63. The software outputs to the sound generation hardware finally includes a white noise control 69 which operates an electronic switch 71 to effectively turn on and off the signal from a white noise generator 73. The outputs from oscillator 63 and white noise generator 73 are summed at a summing circuit 75 and then amplified at an output amplifier 77 before they are supplied to headphones 57.

Referring now to FIG. 7, there is shown a flowchart of a preferred software implementation of the present invention. At block 79, the system queries the active window (A.W.). The system then tests at decision block 81 whether the active window is a message box. If not, the system tests at decision block 83 whether the active window was previously a message box. If the active window was not previously a message box, the system returns to block 79 and again queries the active window. If, on the other hand, the active window was previously a message box, which indicates that the user has selected a push button in the message box thereby causing the previously displayed message box to close, the system, at block B5, cancels the message box sounds and resumes other sounds that may be associated with the interface. Then, the system returns to block 79 and again queries the active window.

If, at decision block 81, the active window is a message box, then the system tests at decision block 87 whether the active window was previously a message box. If not, which indicates that the message box has just opened, the system queries the position of the message box $X_o, Y_o$) at block 89. Then, at block 91, the system announces the message box. It will be recalled that the announcement consists of the text portion of the message box followed by the responses indicated by the push buttons of the message box, followed by the default response. The announcement information is transmitted by RS232 port to the text-to-speech hardware 51 and headphones 57 of FIG. 5.

Referring again to decision block 87 of FIG. 7, if the active window was previously a message box, then the system, at block 93, queries the position (X,Y) of the pointer. Then, at decision block 95, the system test whether the pointer is within the message box. If not, then the system creates the homing signal as indicated generally at block 97.

Figure 8:
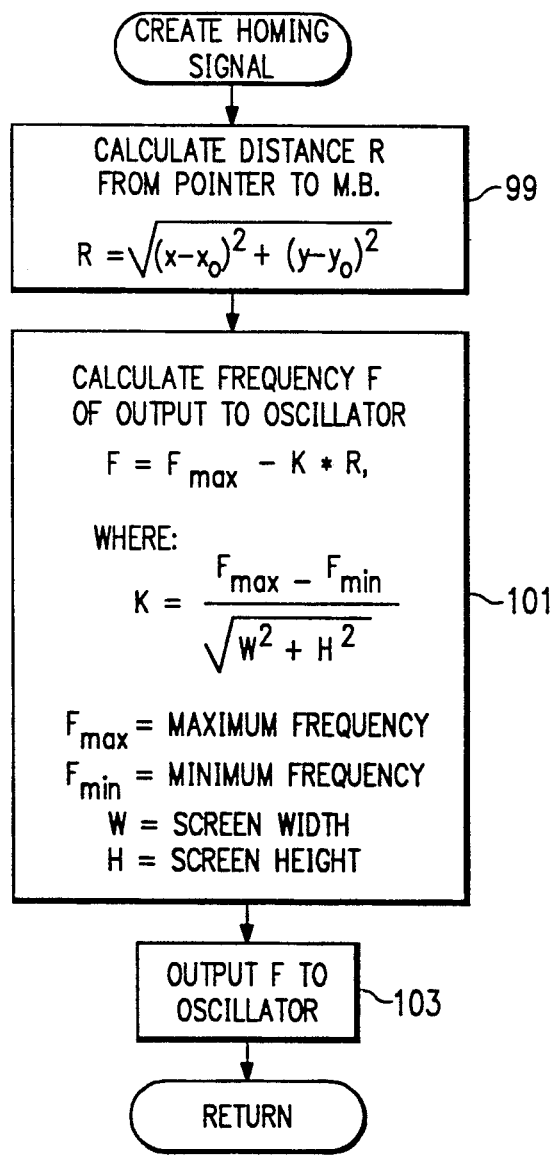
FIG. 8 is a flowchart showing details of the Create Homing Signal sub-routine of the present invention.

Referring now to FIG. 8, there is shown details of the create homing signal of the present invention. First, at block 99, the system calculates the distance R from the pointer to the message box by the formula:

$$R = \sqrt{(X - X_o)^2 + (Y - Y_o)^2}$$

Then, at block 101, the system calculates the frequency F of the output to the oscillator by the formula:

$$F = Fmax - K*R.$$

where;

$$K = \frac{Fmax - Fmin}{\sqrt{W^2 + H^2}},$$

Fmax = maximum frequency
Fmin = minimum frequency
W = screen width
H = screen height The values for the maximum frequency and minimum frequency are selected by the designer of the system and the screen height and width are simply measured on the video monitor. The constant K scales the distance R from the pointer to the message box and converts the distance to a frequency value. After the frequency F has been calculated, the frequency F is output to the oscillator at block 103 and the system returns to query the active window at block 79 of FIG. 7.

The system continues to loop through the query pointer position step of block 93 and create homing signal routine of block 97 as long as the pointer is not within the message box. When, at decision block 95, the pointer enters the message box, the system tests at decision block 105 whether or not the pointer was previously within the message box. If not, which indicates that the pointer has just entered the message box, the system cancels the homing signal, reannounces the message box, and places the pointer on the default button, all as indicated at block 107. Then, the system returns to block 79 and, again, queries the active window. If, referring again to decision block 105, the pointer was previously within the message box, then the system tests at decision block 109 whether the pointer is on a button. If not, the system generates white noise as indicated a block 111 and returns to block 79 and again queries the active window. If, on the other hand, the pointer is on a button, the system tests at decision block 113 whether or not the pointer was previously on the same button. If not, which indicates that the pointer has just arrived on a new button, the system, at block 115 announces the new button and returns to again query the active window at block 79.

From the foregoing, it may be seen that the system of the present invention allows a blind or visually impaired user to handle message boxes and graphical user interfaces quickly and efficiently. By using sound cues and speech announcements, the user is fully enabled to locate and respond appropriately to a message box. Those skilled in the art will recognize, additionally, that the present invention may be used by people who are not necessarily blind or severely visually impaired. For example, people who for one reason or another are unable to read would be better able to operate in a graphical user interface environment by means of the present invention. Also, the present invention might be found to be useful by normally sighted people who can read but who might prefer the additional audio information.

While the invention has been particularly shown and described with reference to a preferred embodiment, those skilled in the art will understand that various changes may be made in form and detail without departing from the spirit and scope of the invention.

What I claim is:

1. A method of enabling a blind or visually impaired user to locate and operate a message box in a computer graphical user interface, said computer graphical user interface including a computer display screen and a pointing device for positioning a pointer on said screen and said message box including a message text and at least one push button indicating an option, said method comprising the steps of:

audibly announcing said text of said message box whenever said message box appears on said screen;

audibly announcing the option indicated by said at least one push button after announcing said text of said message box; and, generating an audible homing signal whenever said pointer is located outside said message box.

2. The method as claimed in claim 1, wherein the frequency of said homing signal is a function of the distance from said pointer to said message box.

3. The method as claimed in claim 2, wherein said frequency increase as said distance decreases.

4. The method as claimed in claim 1, including the step of:

cancelling said homing signal whenever said pointer enters said message box.

5. The method as claimed in claim 4, including the step of announcing the text of said message box whenever said pointer enters said message box.

6. The method as claimed in claim 4, including the step of:

announcing the option indicated by said at least one push button whenever said pointer enters said message box.

7. The method as claimed in claim 6, including the step of automatically positioning said pointer on said at least one button whenever said pointer enters said message box.

* * * * *